United States Patent
Kang

(10) Patent No.: US 7,636,303 B2
(45) Date of Patent: Dec. 22, 2009

(54) PACKET RECEIVING METHOD OF MOBILE TERMINAL

(75) Inventor: Jong-Kook Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 879 days.

(21) Appl. No.: 10/927,153

(22) Filed: Aug. 27, 2004

(65) Prior Publication Data

US 2005/0047418 A1    Mar. 3, 2005

(30) Foreign Application Priority Data

Aug. 30, 2003    (KR) .................... 10-2003-0060593

(51) Int. Cl.
*H04J 3/02*    (2006.01)
*H04W 72/00*    (2009.01)
*G06F 9/46*    (2006.01)

(52) U.S. Cl. ............... 370/230; 370/310; 370/462; 370/468; 455/445; 455/453; 718/103

(58) Field of Classification Search ......... 370/229–234, 370/310, 329, 338, 341, 351–355, 389–393, 370/395.52, 431, 438, 439, 443, 462, 468, 370/412, 428; 455/445, 434, 450, 452.1, 455/452.2, 453, 517, 403, 428; 718/100, 718/102, 103, 107
See application file for complete search history.

(56) References Cited

U.S. PATENT DOCUMENTS 5,999,990 A * 12/1999 Sharrit et al. ............... 718/103
6,006,263 A   12/1999 Horwitz ...................... 709/225
6,111,591 A * 8/2000 Ohtake et al. ............... 345/531
6,192,029 B1 * 2/2001 Averbuch et al. ............ 370/229

(Continued)

FOREIGN PATENT DOCUMENTS

EP    1148689    10/2001

(Continued)

OTHER PUBLICATIONS

European Search Report dated Dec. 22, 2004.

(Continued)

*Primary Examiner*—Aung S Moe
*Assistant Examiner*—Kerri M Rose
(74) *Attorney, Agent, or Firm*—Ked & Associates LLP

(57) ABSTRACT

A packet receiving method of a mobile terminal in which the mobile terminal sets a TCP connection with a server for a packet reception, and a PS (protocol stack) task priority is set to be higher than a UI (user interface) task priority to receive packets. Then, the number of packets stored in a reception queue and signals of a signal queue are monitored while receiving packets. When the number of packets or signals reaches an upper threshold value of a certain level, the UI task priority is altered to be higher than the PS task priority to stop the packet reception and to process the received packets. The number of packets stored in the reception queue and signals of the signal queue is also monitored while processing the packets. When the number of packets or signals reaches a lower threshold value of a certain level, the UI task priority is again altered to be lower than the PS task priority to re-start the packet reception.

24 Claims, 2 Drawing Sheets

U.S. PATENT DOCUMENTS

| | | | |
|---|---|---|---|
| 6,657,980 B2 * | 12/2003 | Holtzman et al. | 370/329 |
| 6,954,429 B2 * | 10/2005 | Horton et al. | 370/230.1 |
| 7,003,302 B2 * | 2/2006 | Yoshida et al. | 455/450 |
| 2002/0199019 A1 | 12/2002 | Battin et al. | 709/238 |
| 2003/0023956 A1 | 1/2003 | Dulberg et al. | 717/130 |
| 2003/0045308 A1 | 3/2003 | Sidhu et al. | 455/466 |

FOREIGN PATENT DOCUMENTS

| | | |
|---|---|---|
| JP | 2001-325176 | 11/2001 |
| JP | 2002-077308 | 3/2002 |
| JP | 2002-330181 | 11/2002 |
| JP | 2003-529865 | 10/2003 |
| KR | 2002-0021577 | 3/2002 |
| KR | 2002-0033307 | 5/2002 |

OTHER PUBLICATIONS

Japanese Office Action dated Aug. 28, 2006.

* cited by examiner

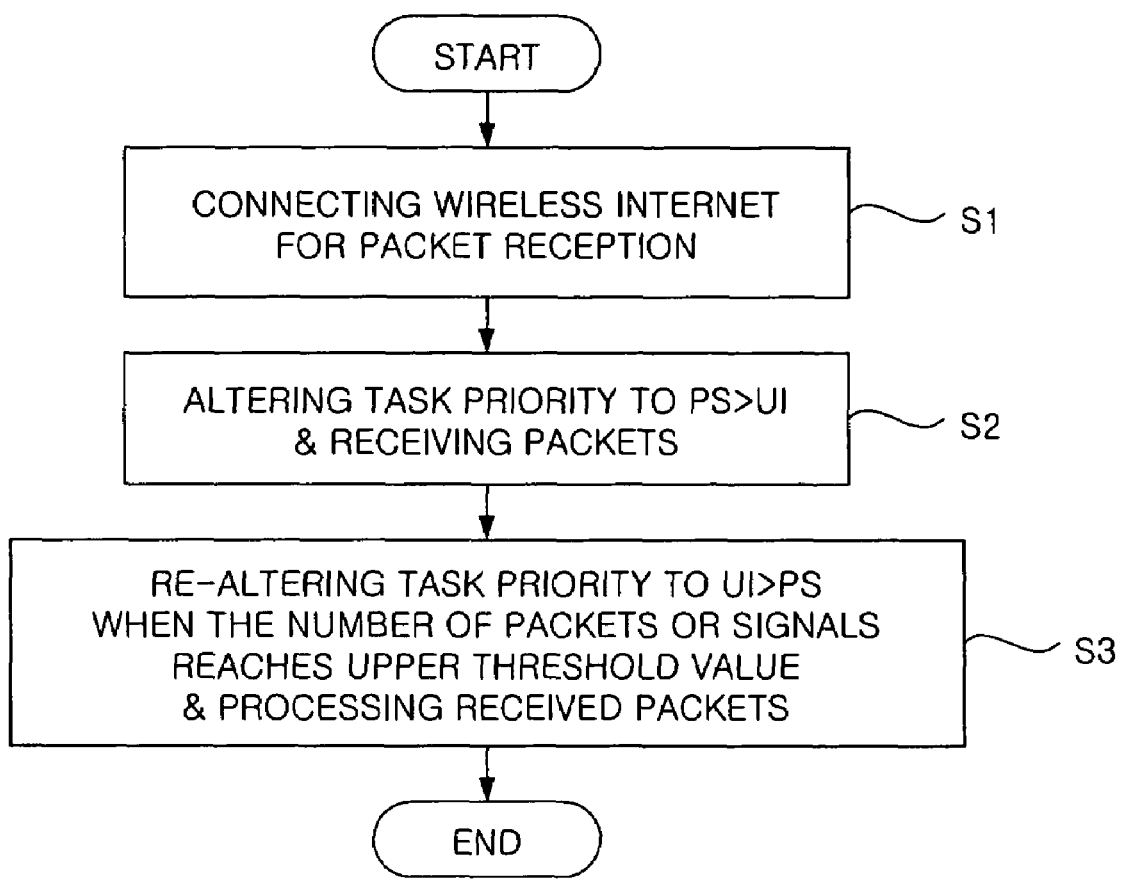

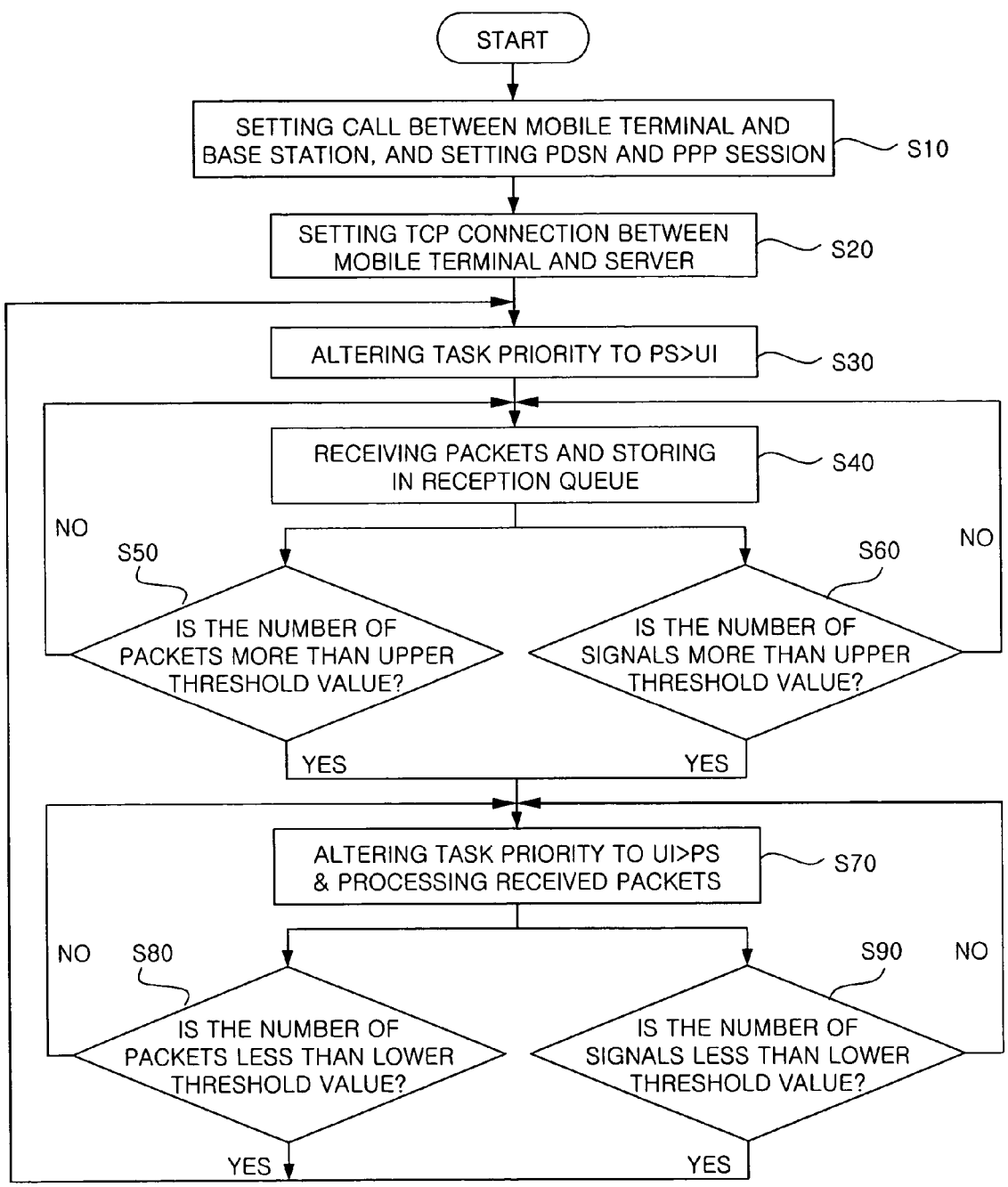

PACKET RECEIVING METHOD OF MOBILE TERMINAL

CROSS-REFERENCE TO A RELATED APPLICATION

This application claims priority to Korean Patent Application No. 60593/2003, filed on Aug. 30, 2003, the entire contents of which is incorporated by reference in its entirety.

BACKGROUND OF THE INVENTION

1. Field of the Invention

The present invention relates to a mobile terminal, and more particularly to a packet receiving method of a mobile terminal that increases a reception performance of packet data from a wireless network to a mobile terminal.

2. Background of the Related Art

A transmission control protocol (TCP) is a protocol applied in a wire network including a server and client. An operation system such as Windows or a Unix operating system based on a multi-task or a multi-thread method is generally implemented in the client and server and TCP is used to transfer files between the client and server.

However, a mobile terminal used as a TCP client in a wireless network has a much lower operation system capability than a server or a client in a wire network. One example of an operation system of the mobile terminal is a REX system included in software provided by QUALCOMM™. The REX system is a real-time operating system (RTOS) and is a very simple operating system compared to an operating system used in a wire network.

Therefore, it is difficult to sufficiently utilize a flow control based on a sliding window method operated by the TCP in the mobile terminal. In more detail, the sliding window method is for transmitting several packets at one time and receiving a consecutive response that the transmitted packets are received from the receiving side. If the transmission side receives a response that the transmitted packets are not successfully received from the receiving side, the transmission side re-transmits the packets.

Further, the mobile terminal transmits a number of packets it can receive before an application is processed to an advertised window at the time of requesting a TCP setting, and waits to receive the packets. However, because the application is performed whenever a new packet is received, the flow control of the mobile terminal is performed using a stop and wait method, which has a lower function than the sliding window method. The stop and wait method is for receiving a response whenever one packet is transmitted, and has much lower link efficiency than the sliding window method. Further, the full application bandwidth is not effectively utilized with the stop and wait method.

SUMMARY OF THE INVENTION

Accordingly, one object of the present invention is to at least address the above-noted and other problems.

Another object of the present invention is to optimize a wireless internet downloading function by controlling a task priority so that a window size can be efficiently controlled at the time of a TCP connection of a mobile terminal.

To achieve these and other advantages and in accordance with the purpose of the present invention, as embodied and broadly described herein, the present invention provides a novel packet receiving method of a mobile terminal, which includes setting a call between a mobile terminal and a base station, setting a session between the terminal and a packet data serving node (PDSN), and setting a transmission control protocol (TCP) connection between the mobile terminal and a server. The method also includes receiving packets by altering a task priority when the setting is completed, and processing the received packets by re-altering the task priority when the number of packets or signals is mote than a certain level.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a flowchart showing a packet receiving method of a mobile terminal according to the present invention; and FIG. 2 is a flowchart showing a detailed process of the packet receiving method of a mobile terminal according to the present invention.

BEST MODE OF THE INVENTION

Reference will now be made in detail to the preferred embodiments of the present invention, examples of which are illustrated in the accompanying drawings.

The present invention controls a task priority for modules of an operating system of a mobile terminal for an optimized flow control during a transmission control protocol (TCP) connection between the mobile terminal and a server. The tasks includes, for example, a user interface (UI) task for displaying information, key-inputting, and performing a TCP application; a protocol stack (PS) task for handling a protocol such as an internet protocol (IP), a point-to-point protocol (PPP), etc.; and a reception/transmission (Rx/Tx) task for transmitting a protocol data unit (PDU) to a base station through a wireless network or receiving the PDU from the base station.

Turning now to FIG. 1, which is a flowchart showing a packet receiving method of a mobile terminal according to the present invention. As shown, the packet receiving method includes setting a call between a mobile terminal and a base station, setting a session between the mobile terminal and a packet data serving node (PDSN), and setting a transmission control protocol (TCP) connection between the mobile terminal and a server (S1). The method also includes receiving packets by altering a task priority when the setting is completed (S2) and processing the received packets by re-altering the task priority when more than a certain amount of packets are received or a number of signals is more than a certain amount (S3).

Preferably, the task priority is initially set so that the priority of the UI task is higher than that of the PS task. Then, when the TCP connection between the terminal and the server is set, the task priority is altered so that the priority of the PS task is higher than that of the UI task, thereby receiving and storing packets. Then, when more than a certain amount of packets are received or the number of signals is more than a certain level, the task priority is again altered so that the priority of the UI task is higher than that of the PS task, thereby processing the received packets.

In addition, when the number of the received packets and signals is less than a certain level, preferably the task priority is again altered so that the priority of the PS task is higher than that of the UI task, thereby re-starting the reception of packets.

Next, FIG. 2 is a flowchart showing a detailed process for the packet receiving method of a mobile terminal according to the present invention. As shown, a call is set between the mobile terminal and a base station to receive packets, thereby setting a PDSN and a point-to-point protocol (PPP) session (S10). As noted above, the priority of the PS task is initially set to be lower than that of the UI task.

Then, the mobile terminal sets a TCP connection with a server having the requested data to be received (S20). If the setting is completed, the priority is altered so the priority of the PS task is higher than that of the UI task (S30). Thus, the data packets are received and stored.

Further, the amount of packets received correspond with a size of a TCP receiving queue (e.g., an advertised window at the time of the TCP setting). The received packets are stored in the TCP reception queue (S40).

In addition, a control unit (not shown) of the mobile terminal monitors the packets received in the TCP reception queue, and determines whether or not the number of packets reaches an upper threshold value of a certain level (S50). As discussed above, the reception queue is a queue for receiving TCP packets and the received packets are stored in the reception queue. Further, packets are also read from the reception queue when an application reads data from the packets.

The control unit also monitors the number of signals of a UI task signal queue, and determines whether the number of signals reaches a preset upper threshold value (S60). Note that the signal queue is for storing a signal used for communicating between each task, and is also referred to as a mail box in some operating systems. For example, if packets are stored in the reception queue, the PS task transmits a signal to the UI task to inform the UI task about a state of the received packets. Then, the UI task certifies the signal received from the signal queue, and performs an operation such as reading packets from the reception queue.

Then, when the number of packets stored in the reception queue reaches an upper threshold value or when the number of signals of the UI task signal queue reaches an upper threshold value (Yes in S60 and S70), the priority of the PS task is altered to be lower than that of the UI task, thereby beginning the processing of the stored packets by the application (S70).

While performing the step S70, the control unit of the mobile terminal continuously monitors packets received in the TCP reception queue, and determines whether or not the number of packets reaches a lower threshold value of a certain level (S80). The control unit of the mobile terminal also monitors the number of signals of the UI task signal queue, and determines whether the number of signals reaches a lower threshold value (S90).

When the number of packets reaches a lower threshold value or the number of signals of the UI task signal queue reaches a preset threshold value, the task priority is again altered so that the PS task priority is higher than the UI task priority, thereby restarting reception of packets. Thus, the TCP flow control is smoothly operated by a sliding window method in a wireless network.

As aforementioned, in the packet receiving method of a mobile terminal according to the present invention, each task priority is controlled according to an amount of packets received in the terminal, a state and a degree that the received packets are processed, etc., thereby efficiently controlling a window size at the time of the TCP connection between the mobile terminal and the server and thus having an optimized wireless internet downloading function.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A packet receiving method of a mobile terminal, comprising:
    setting a call between a mobile terminal and a base station, setting a session between the mobile terminal and a packet data serving node (PDSN), and setting a transmission control protocol (TCP) connection between the terminal and a server;
    altering a task priority for a first time when the TCP connection is completed, said altering including setting a priority of a protocol stack (PS) to be greater than a priority of a user interface (UI);
    receiving packets;
    storing the packets in a TCP queue;
    monitoring a number of packets stored in the TCP queue;
    monitoring a number of signals stored in a UI task signal queue;
    if the number of packets in the TCP queue exceeds a first value or the number of signals in the UI task signal queue exceeds a second value, then altering the task priority for a second time, said altering the task priority for a second time including setting the priority of the UI to be greater than the priority of the PS; and
    if the number of packets in the TCP queue falls below a third value or the number of signals in the UI task signal queue is less than a fourth value, then altering the task priority for a third time, said altering the task priority for a third time includes setting the priority of the PS to be greater than the priority of the UI,
    wherein altering the task priority for the first time and the second time includes altering tasks to be performed within the mobile terminal and wherein the TCP queue and UI task signal queue are located within the mobile terminal.

2. The method of claim 1, wherein an amount of packets that can be received corresponds to a size of the TCP queue.

3. The method of claim 2, wherein the packets are read from the TCP queue when an application reads data from the packets.

4. The method of claim 1, wherein the UI task signal queue outputs a signal for making a UI task read packets from the TCP queue.

5. The method of claim 1, wherein tasks whose priority is to be altered for the first time and the second time within the mobile terminal include at least one of a user interface (UI) task, a protocol stack (PS) task, or a reception/transmission (Rx/Tx) task performed within the mobile terminal, and wherein the task priority is initially set so the UI task priority is higher than the PS task priority.

6. The method of claim 1, wherein said processing includes:
altering the task priority for the second time when a number of control signals transmitted between tasks to be performed within the mobile terminal is more than the second value.

7. The method of claim 6, wherein the control signals relate to a state of the received packets.

8. The method of claim 1, wherein said processing includes:
processing the received packets when a number of control signals relating to a mailbox function to be performed in the mobile terminal is more than a certain level.

9. The method of claim 1, wherein more than the certain level corresponds to falling below the certain level.

10. The method of claim 1, wherein more than the certain level corresponds to rising above the second value.

11. The method of claim 1, wherein altering the task priority for a second time includes processing the stored packets by one or more applications.

12. The method of claim 1, wherein altering the task priority for a third time includes re-starting reception of packets.

13. A packet receiving method of a mobile terminal comprising:
setting a call between a mobile terminal and a base station, setting a point-to-point protocol (PPP) session between the mobile terminal and a packet data serving node (PDSN), and setting a transmission control protocol (TCP) connection between the mobile terminal and a server;
setting priority of tasks to be performed within the mobile terminal, said setting including setting a priority of a protocol stack (PS) task to be higher than that of a user interface (UI) task when setting the TCP connection is completed;
storing packets in a TCP reception queue;
determining whether or not a number of packets stored in the TCP reception queue or a number of signals stored in a UI task signal queue reaches an upper threshold value of a certain level; and
processing the stored packets by an application by altering a priority of the PS task to be lower than that of the UI task when the number of packets or signals reaches the upper threshold value, wherein the TCP reception queue and the UI task signal queue are located within the mobile terminal, and
wherein if the number of packets in the TCP queue or the number of signals in the UI task signal queue reaches another threshold value, then altering the task priority by setting the priority of the PS to be greater than the priority of the UI.

14. The method of claim 13, wherein the priority of the UI task is initially set to be higher than that of the PS task.

15. The method of claim 13, wherein determining whether or not the number of packets or signals reaches the upper threshold value comprises monitoring the number of packets received in the TCP reception queue or the number of signals in the UI task signal queue.

16. The method of claim 13, further comprising:
determining whether or not the number of packets in the TCP reception queue or the number of signals in the UI task signal queue reaches a lower threshold value of a certain level.

17. The method of claim 16, wherein determining whether or not the number of packets in the TCP reception queue or the number of signals in the UI task signal queue reaches the lower threshold value comprises monitoring the number of packets received in the TCP reception queue or the number of signals in a UI task signal queue.

18. The method of claim 16, further comprising:
altering the priority of the PS task to be higher than that of the UI task when the number of the packets in the TCP reception queue or the number of signals in the UI task signal queue reaches the lower threshold value.

19. A mobile terminal packet receiving method, comprising:
alternating between a User Interface (UI) task that handles user interface functions and a Protocol Stack (PS) task that processes data packets when using an Internet protocol to download the data packets onto the mobile terminal such that the PS task is set to have a higher priority when an Internet connection has been established with a data server including the data packets to be downloaded and the UI task is set to have a higher priority when a number of the downloaded data packets exceeds a first predetermined upper threshold, wherein the UI task and the PS tasks are tasks performed within the mobile terminal, and
wherein if the number of packets in the TCP queue or the number of signals in the UI task signal queue reaches another predetermined threshold, then altering the task priority by setting the priority of the PS to be greater than the priority of the UI.

20. The method of claim 19, further comprising:
re-setting the PS task to have the higher priority when the number of downloaded data packets is less than a first predetermined lower threshold.

21. The method of claim 20, further comprising:
setting the UI task to have the higher priority when a number of UI signals exceeds a second predetermined upper threshold.

22. The method of claim 21, further comprising:
re-setting the PS task to have the higher priority when the number of UI signals is less than a second predetermined lower threshold.

23. The method of claim 21, further comprising:
monitoring a reception queue that receives the downloaded data packets to determine whether or not the number of downloaded data packets exceeds the first predetermined upper threshold or is less than the first predetermined lower threshold; and
monitoring a UI signal queue that receives the UI signals to determine whether or not the number of UI signals exceeds the second predetermined upper threshold or is less than the second predetermined lower threshold.

24. The method of claim 19, further comprising:
initially setting a priority of the UI task to have a higher priority than the PS task.

* * * * *